(12) United States Patent
Uhlemann

(10) Patent No.: US 6,876,876 B2
(45) Date of Patent: Apr. 5, 2005

(54) FOLDABLE ALPHANUMERIC KEYPAD FOR MOBILE PHONES

(76) Inventor: Gisela Uhlemann, Am Mühlenberg 7, 45721 Haltern (DE)

( * ) Notice: Subject to any disclaimer, the term of this patent is extended or adjusted under 35 U.S.C. 154(b) by 607 days.

(21) Appl. No.: 09/804,276

(22) Filed: Mar. 12, 2001

(65) Prior Publication Data

US 2001/0024946 A1 Sep. 27, 2001

(30) Foreign Application Priority Data

Mar. 23, 2000 (DE) .......................................... 100 14 166

(51) Int. Cl.[7] .............................................. H04B 1/38
(52) U.S. Cl. .............................. 455/575.3; 455/575.1; 455/66.1; 455/550.1; 455/351; 345/169
(58) Field of Search .................................. 345/168, 169, 345/156, 173, 901; 379/446, 455, 449, 454, 433.07, 368; 455/66.1, 550.1, 575.1, 575.3, 351, 556.1, 556.2, 566

(56) References Cited

U.S. PATENT DOCUMENTS

| | | | | |
|---|---|---|---|---|
| 5,719,799 A | * | 2/1998 | Isashi ........................ 708/105 |
| D398,307 S | * | 9/1998 | Collins ..................... 455/550.1 |
| 5,991,644 A | * | 11/1999 | Ogawa ........................ 455/566 |
| 5,995,025 A | * | 11/1999 | Sternglass et al. ............ 341/22 |
| 6,262,785 B1 | * | 7/2001 | Kim ............................. 349/58 |
| 6,327,482 B1 | * | 12/2001 | Miyashita ................ 455/556.1 |
| 6,510,325 B1 | * | 1/2003 | Mack et al. .............. 455/575.2 |
| 6,661,404 B1 | * | 12/2003 | Sirola et al. ................ 345/168 |
| 2002/0119685 A1 | * | 8/2002 | Gardenfors et al. .......... 439/86 |

* cited by examiner

*Primary Examiner*—Lee Nguyen
*Assistant Examiner*—Sanh Phu
(74) *Attorney, Agent, or Firm*—Thomas E. Baker, Jr.

(57) ABSTRACT

The invention relates to an alphanumeric keypad (1), especially foldable alphanumeric keypad, which is stored on the back of a mobile phone. The alphanumeric keypad (1) (membrane keys, pushbuttons and/or touchscreen display pages) is stored in such a way that it closely follows the shape of the mobile phone. When needed, this keypad is folded out (3) and functionally connected to the front keypad by means of a switching contact. Now, the message can be quickly typed in and sent. After the message has been transmitted, the keypad is folded back and the connection disabled. The touchscreen display pages can be used for interactive communication (keypad) or for displaying Internet pages.

11 Claims, 1 Drawing Sheet

FOLDABLE ALPHANUMERIC KEYPAD FOR MOBILE PHONES

The invention relates to an alphanumeric keypad, which is connected to a mobile phone.

Currently, brief written messages are entered into a mobile phone via SMS (Short Message Service) on a keypad on the front of the phone. Here, several letters are assigned to one number button on the phone. For instance, key 1=GHI, and 2=JKL. With this method, writing is very time-consuming. Another possibility is a small, separate alphanumeric keypad, which can be inserted into the existing cellular phone holder. Using this method, inputting letters is quick and easy, but the big disadvantage is the inconvenience of having to carry this separate and rigid keypad along with the cellular phone.

The object of this invention is an alphanumeric keypad for mobile phones that does not have the above-mentioned disadvantages in sending SMS-messages or transporting it.

According to the invention, these problems are solved with a mobile-phone keypad having the identifying characteristics of the independent claims.

The solution according to the invention has the following advantages in particular:

The alphanumeric keypad (membrane keys, pushbuttons and/or touchscreen display pages) is stored in such a way that it closely follows the shape of the mobile phone. When needed, this keypad is folded out and functionally connected to the front keypad by means of a switching contact. Now, the message can be quickly typed in and sent. After the message has been transmitted, the keypad is folded back and the connection disabled. Now the mobile phone can be used for phone calls as usual. Touchscreen display pages can be used for interactive communication (keypad) or for displaying internet pages.

The invention is depicted in the enclosed drawings as an example, where

Figure 3:
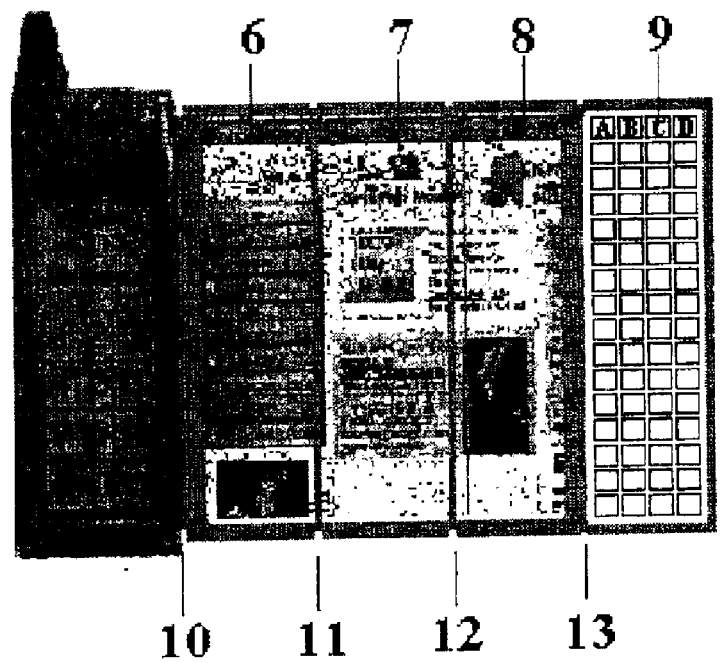

FIG. 3 shows a cellular phone with unfolded touchscreen display pages with, for instance, an internet image on pages 6, 7, 8, and an alphanumeric keypad on page 9. Via hinges 10, 11, 12, 13, the pages can be folded together or unfolded.

As can be seen in the drawings, the alphanumeric keypad (membrane keys, pushbuttons and/or touchscreen display pages) is stored in such a way that it closely matches the shape of the mobile phone. When needed, this keypad is folded out and functionally connected to the front keypad by means of a switching contact. Now, the message can be quickly typed in and sent. The touchscreen display pages can be used for interactive communication (keypad) or for displaying internet pages.

Figure 1:
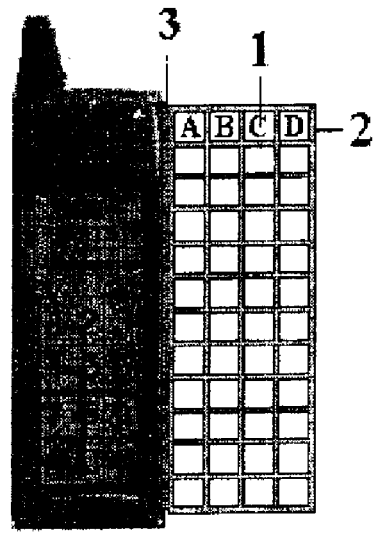
FIG. 1 shows a cellular phone with laterally folded-out housing component (2) containing the alphanumeric keypad (1) and/or touchscreen display page. Hinges (3) permit housing component (2) to be folded over.
Figure 2:
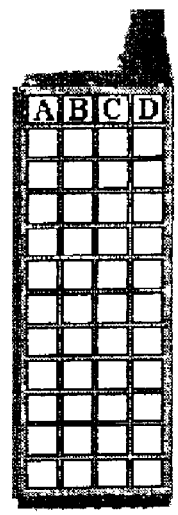
FIG. 2 shows a cellular phone with folded-back housing component.

In FIG. 1, the keypad (membrane keys, pushbuttons and/or touchscreen display pages) 1, especially alphanumeric keypad, is connected to the mobile phone, with keypad 1 installed separately in housing component 2, and placed near the housing on one of the sides of the cellular phone housing, especially the back of the mobile phone (FIG. 2). Housing component 2, incl. keypad, can be folded by means of hinges 3.

Several touchscreen display pages, e.g. one to six pages, especially four touchscreen display pages 6, 7, 8, 9 (see FIG. 3), are foldable via hinges 10, 11, 12, 13.

The keypad, when folded out, is functionally connected to the front keypad via a contact. When the keypad is returned to its folded position, its keys are disabled via the contact.

What is claimed is:

1. Mobile communication device comprising a first housing component having front and back sides with a first keyboard arranged at the front side for entering communication numbers and a second housing having front and back sides with a second keyboard (1) arranged in the front side of the second (2) housing component, wherein the second housing component is connected mechanically by means of hinges (10, 11, 12, 13) to the first housing component, whereby the first and second keyboards can be arranged in a single plane by folding out the second housing component, characterized in that the keyboards are so arranged in the respective front sides of the first and second housing components that, when the second housing is folded back, the second housing component back side is on the back side of the first housing such that the second keyboard faces away from the first keyboard.

2. Mobile communication device according to claim 1, characterized in that after opening the keyboards are arranged side by side.

3. Mobile communication device according to claim 2, characterized in that at least the second keyboard comprises a keyboard including a film keyboard, a push button keyboard and/or a touchscreen display keyboard.

4. Mobile communication device according to claim 2, characterized in that several touchscreen display pages (6, 7, 8) are arranged aside the second keyboard (1, 9) and can be swiveled by means of hinges (10, 11, 12, 13).

5. Mobile communication device according to claim 2, characterized in that the second keyboard (1, 9), when it is opened or closed, respectively, is connected to or disconnected from the front side keyboard by means of a contact.

6. Mobile communication device according to claim 1, characterized in that at least the second keyboard comprises a keyboard including a film keyboard, a push button keyboard and/or a touchscreen display keyboard.

7. Mobile communication device according to claim 6, characterized in that several touchscreen display pages (6, 7, 8) are arranged aside the second keyboard (1, 9) and can be swiveled by means of hinges (10, 11, 12, 13).

8. Mobile communication device according to claim 6, characterized in that the second keyboard (1, 9), when it is opened or closed, respectively, is connected to or disconnected from the front side keyboard by means of a contact.

9. Mobile communication device according to claim 1, characterized in that the second keyboard (1, 9), when it is opened or closed, respectively, is connected to or disconnected from the front side keyboard by means of a contact.

10. Mobile communication device according to claim 1, characterized in that several touchscreen display pages (6, 7, 8) are arranged aside the second keyboard (1, 9) and can be swiveled by means of hinges (10, 11, 12, 13).

11. Mobile communication device according to claim 10, characterized in that the second keyboard (1, 9), when it is opened or closed, respectively, is connected to or disconnected from the front side keyboard by means of a contact.

* * * * *